United States Patent
Garau

(10) Patent No.: US 8,042,279 B2
(45) Date of Patent: Oct. 25, 2011

(54) HORIZONTAL-ARM COORDINATE MEASURING MACHINE

(75) Inventor: Enrico Garau, Turin (IT)

(73) Assignee: Hexagon Metrology S.p.A., Moncalieri (IT)

( * ) Notice: Subject to any disclaimer, the term of this patent is extended or adjusted under 35 U.S.C. 154(b) by 19 days.

(21) Appl. No.: 12/296,060

(22) PCT Filed: Apr. 6, 2006

(86) PCT No.: PCT/IT2006/000230
§ 371 (c)(1), (2), (4) Date: May 13, 2010

(87) PCT Pub. No.: WO2007/113879
PCT Pub. Date: Oct. 11, 2007

(65) Prior Publication Data
US 2010/0218393 A1   Sep. 2, 2010

(51) Int. Cl.
*G01B 5/008* (2006.01)
(52) U.S. Cl. .......................... 33/503; 33/556
(58) Field of Classification Search ............. 33/503, 33/556, 559, 1 M
See application file for complete search history.

(56) References Cited

U.S. PATENT DOCUMENTS

| | | | |
|---|---|---|---|
| 5,621,978 A | 4/1997 | Sarauer | |
| 6,163,973 A * | 12/2000 | Matsumiya et al. | 33/559 |
| 6,430,828 B1 * | 8/2002 | Ulbrich | 33/503 |
| 6,854,193 B2 * | 2/2005 | Lotze | 33/502 |
| 7,191,540 B1 * | 3/2007 | Brewer et al. | 33/551 |
| 7,363,181 B2 * | 4/2008 | Katayama et al. | 702/85 |
| 7,644,507 B2 * | 1/2010 | Fuchs et al. | 33/503 |
| 7,779,549 B2 * | 8/2010 | Garau | 33/503 |
| 2003/0037451 A1 * | 2/2003 | Sarauer | 33/608 |
| 2004/0231177 A1 * | 11/2004 | Mies | 33/503 |
| 2005/0172505 A1 * | 8/2005 | Trull et al. | 33/503 |
| 2009/0217540 A1 * | 9/2009 | Garau | 33/503 |
| 2009/0265945 A1 * | 10/2009 | Garau | 33/503 |
| 2010/0132432 A1 * | 6/2010 | Wallace et al. | 73/1.75 |
| 2010/0218393 A1 * | 9/2010 | Garau | 33/503 |
| 2010/0319207 A1 * | 12/2010 | Held | 33/503 |

FOREIGN PATENT DOCUMENTS

| | | |
|---|---|---|
| DE | 3920718 A1 | 1/1991 |
| DE | 4402061 C1 | 5/1995 |
| GB | 2191000 A | 12/1987 |

* cited by examiner

*Primary Examiner* — Yaritza Guadalupe
(74) *Attorney, Agent, or Firm* — Orrick Herrington & Sutcliffe, LLP

(57) ABSTRACT

A coordinate measuring machine (1) comprising a base (2) provided with guides (3) parallel to a first axis X, a first mobile carriage (4) on the guides (3) along the axis X and provided with an upright (17), a second carriage (6) carried by the upright (17) and mobile along a second vertical axis Z, and a horizontal arm (7) carried by the second carriage (6) and axially mobile along a third horizontal axis Y perpendicular to the axis X; the first carriage (4) comprises a base (16) provided with a first portion (19, 20) coupled to the guides (3) and a second portion (18) rigidly connected to the upright (17), releasable connection means (27) for reciprocally connecting the first portion (19, 20) and the second portion (18) of the base (16), and articulated connection means (28) between the first portion (19, 20) and the second portion (18) of the base to allow the upright (17) to be tipped when the releasable connection means (27) are released.

11 Claims, 4 Drawing Sheets

HORIZONTAL-ARM COORDINATE MEASURING MACHINE

TECHNICAL FIELD

The present invention relates to a coordinate measuring machine of the horizontal-arm type.

BACKGROUND ART

Coordinate measuring machines of the aforesaid type are known, comprising a base provided with guides along a first horizontal axis X, a first carriage mobile on the base along the axis X and comprising an upright provided with guides extending along a second vertical axis Z, a second carriage carried by the upright and sliding on the same along axis Z, and an arm carried by the second carriage and extending along a third horizontal axis Y orthogonal to the axis X. One end of the arm is adapted to carry a contact or optical detector for measuring the dimensional features of parts.

Machines of this type may be used, for example, in the automotive industry, individually or in pairs, for dimensional monitoring of vehicle bodyworks on manufacturing lines; such machines are therefore large in size. For example, the measuring volume may be in the order of 6-7 m along axis X, 1.5-2 m along axis Y, and 2-3 m along axis Z.

The coordinate machines of the type briefly described must be assembled and tested at the manufacturing plant, and therefore disassembled again, at least partially, to be transported to the installation plant. It is indeed unthinkable, given the dimensions of the concerned machines, to deliver them assembled.

Such subsequent assembly and disassembly operations, as well as the component packing operations, are time-consuming and costly.

DISCLOSURE OF INVENTION

It is therefore the object of the present invention to provide a horizontal-arm coordinate measuring machine which is free from the aforesaid technical problem.

This object is achieved by a measuring machine according to claim 1.

BRIEF DESCRIPTION OF THE DRAWINGS

For a better understanding of the present invention, it will now be described a preferred embodiment by way of non-limitative example, and with reference to the accompanying drawings, in which.

BEST MODE FOR CARRYING OUT THE INVENTION

Figure 1:
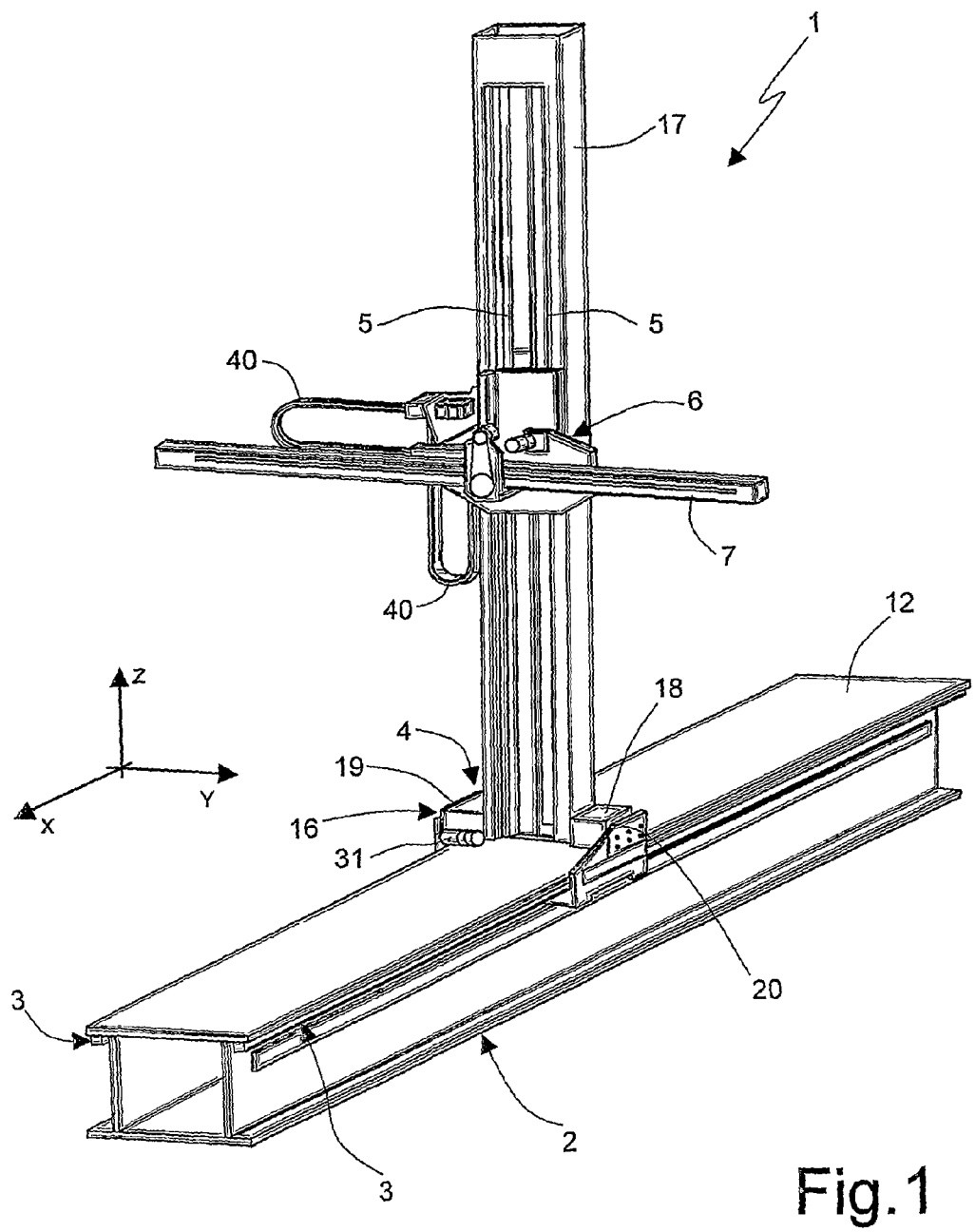
FIG. 1 is a perspective view of a horizontal-arm coordinate measuring machine, in use position.

In FIG. 1, it is indicated as a whole by 1 a horizontal-arm coordinate measuring machine.

Machine 1 essentially comprises a base 2 provided with guides 3 along a horizontal axis X, a first carriage 4 mobile on the base 2 along the axis X and provided with guides 5 extending along a vertical axis Z, a second carriage 6 carried by the first carriage 4 and sliding along the axis Z, and a horizontal arm 7 carried by the second carriage 6, extending along a axis Y orthogonal to the axis X and axially mobile along the axis Y. One end of the arm 7 is adapted to carry a contact or optical detector (not shown) for measuring dimensional features of parts.

Figure 4:
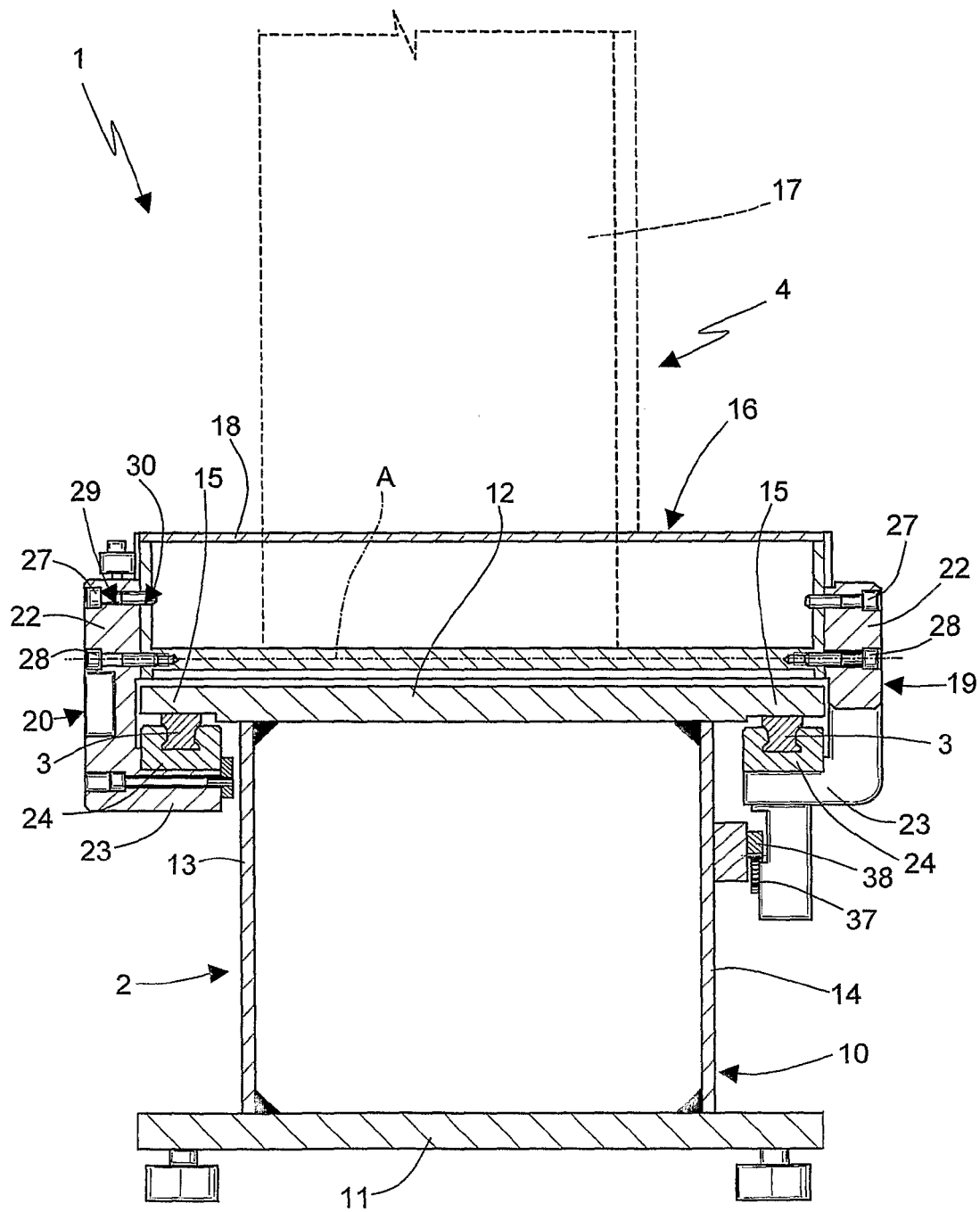
FIG. 4 is a section taken along line IV-IV in FIG. 3.

More specifically, base 2 (FIG. 4) essentially consists of a box-type structure 10 elongated in the direction of the axis X, with constant section, having a flat horizontal bottom wall 11 and top wall 12, and a pair of vertical, reciprocally parallel side walls 13, 14. The side walls 13, 14 are reciprocally spaced at a distance smaller than the width of the walls 11, 12 so that these laterally protrude from the side walls 13, 14 with respective side wings 15.

The sliding guides 3 for the first carriage 4 along the axis X are fixed under the side wings 15 of the top wall 12, which therefore presents a flat treadable upper surface, being free from guides and delicate components.

The first carriage 4 comprises a lower base 16 mobile on the guides 3 and an upright 17 having a vertical axis tubular structure which extends upwards from the base 16 and carries the guides 5 for carriage 6.

More precisely (FIG. 4), the base 16 consists of a central body 18 rigidly fastened to the upright 17 and a pair of side shoulders 19, 20 fixed to opposite sides of the central body 18 and each sliding along a respective guide 3.

Each of the shoulders presents an essentially L-shaped section, with a vertical plate portion 22 adapted to be fastened to the central body 18 and a lower horizontal portion 23 extending underneath the respective wing 15.

Ball circulation runners 24 cooperating with the respective guides 3 are fastened on portions 23, conveniently provided with inclined surfaces defining with the balls an "O"-type contact pattern. Alternatively, the contact pattern may be of the "X" type; according to another possible embodiment, the runners 24 may be replaced by runners of the pneumostatic type.

Conveniently, the shoulder 20 presents longer extension along the axis X and is provided with two runners 24; a single runner is carried by shoulder 19. In this way, three rests and therefore an isostatic constraint system are defined as a whole on the guides 3. Such system is rigid according to all degrees of freedom, except for shifting along the axis X.

The plate portions 22 of the shoulders 19, 20 are fastened to the central body by means of a plurality of screws 27, 28, in total six arranged on two horizontal rows of three in the example shown. Such screws 27, 28 throughly engage respective holes 29 made in the plate portions 22 and are adapted to be fastened in respective threaded holes 30 of the central body 18. The holes 30 on opposite sides of the central body 18 are paired and reciprocally coaxial.

The mobile parts of the machine are moved, in a per se known way, by means of rack and pinion devices driven by respective electric motors 31, 32, 33. In particular, the first carriage 4 is actuated by an electric motor 31 carried by the shoulder 19 (FIG. 2), which provides motion via a belt 35 to a pulley 36 integral with a pinion 37 (FIG. 4) which meshes with a rack 38 fastened on the side wall 14 of the base 2 in direction parallel to the axis X. The actuating devices of the second carriage 6 and of the arm 7 are similar and are not described in detail.

The connection of the electric motors 31, 32, 33 to the respective power and control system (not shown) is achieved by means of wirings (not shown) which are housed in articulated chains 40 in the transition zones between relatively moving parts. In particular, FIG. 2 clearly shows a chain 40 associated to motor 31, which has one end secured to the base 2 and one end secured to the shoulder 19.

According to the present invention, the upright 17 of the machine 1 machine may be tipped and folded on the base 2 to favour the transportation of the machine 1 from the place of manufacture to the place of installation.

Figure 3:
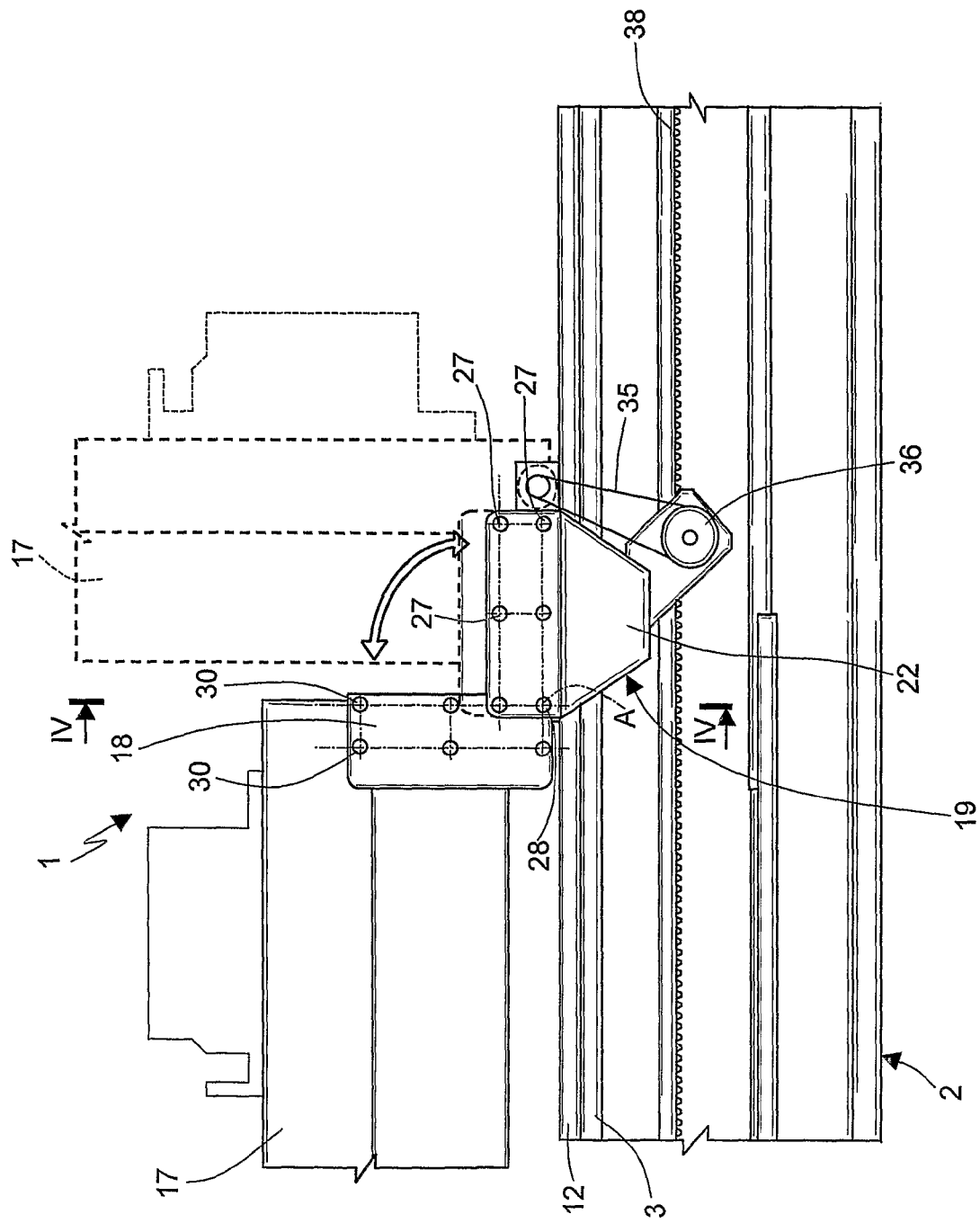
FIG. 3 is a side view, in a magnified scale, of a detail of the machine in FIG. 1.

In particular, the upright 17 may be tipped by removing all the screws (27) which connect the central body 18 to the side shoulders 19, 20 except for one screw (28) on each side (FIG. 3). The screws 28, reciprocally coaxial, therefore define an axis of rotation A for the central body 18, and therefore for the upright 17 rigidly connected thereto, with respect to the shoulders 19, 20 which remain secured to the guides 3.

It is therefore possible to fold the upright 17 on the base 2 so as to reduce the overall dimensions of the machine for packing and transportation.

Figure 2:
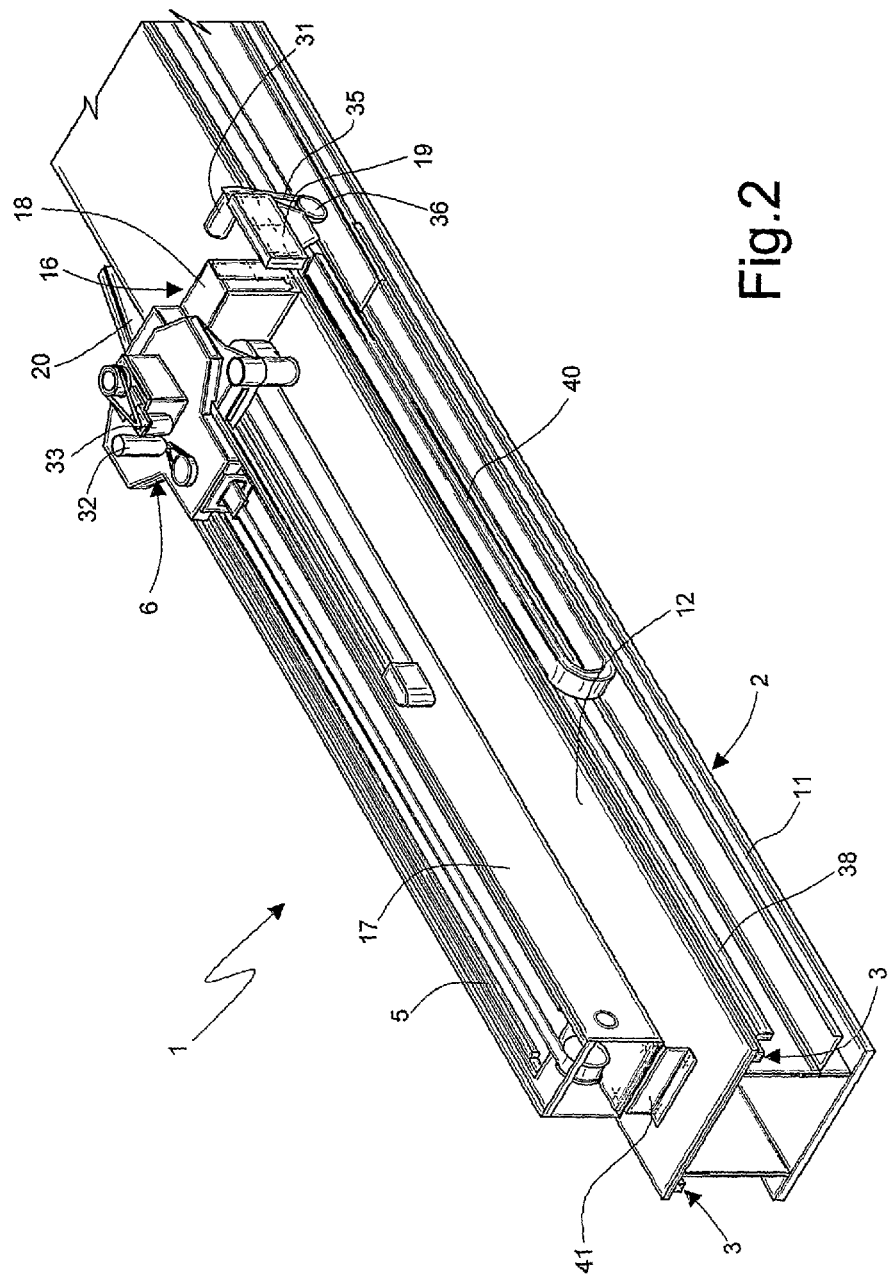
FIG. 2 is a partial perspective view of the machine in FIG. 1, in a partially disassembled and folded configuration.

A bracket 41 (FIG. 2), fastened in conventional way, for example by means of simple screws, to an upper end of the upright 17, may be fastened to the upper surface 12 of the base, usually provided with holes, so as to lock the upright 17 in the tipped position. Conveniently, before tipping the upright 17, the horizontally arm 7 is appropriately removed and the second carriage 6 is arranged in its lowest position (FIGS. 2 and 3).

In this way, the costly operations of disassembly at the place of manufacture and reassembly at the place of use are avoided.

It is to be noted that when upright 17 is tipped, the electric motor 31 and the respective chain 40 are secured to the shoulder 19 and therefore the wiring is not subjected to abnormal stress during tipping.

It is finally apparent that changes and variations can be implemented to the machine 1 described and illustrated without departing from the scope of protection of the claims.

In particular, screws 28 can be replaced by other articulated connection means, so as to allow the upright 17 to be tipped with respect to the shoulders 19, 20. Such tipping, although preferably consisting of a simple rotation about an axis, may be also defined by a more complex motion.

Screws 27 may be replaced by any releasable connection means.

Larger measuring volume in the direction of the axis X may be obtained by joining several bases longitudinally.

The invention claimed is:

1. A coordinate measuring machine comprising a base provided with first guiding means along a first horizontal axis, a first carriage mobile on the base along said first axis and comprising an upright provided with second guiding means extending towards a second vertical axis, a second carriage carried by the upright and slidable along said second axis, and a horizontal arm carried by the second carriage extending along a third horizontal axis orthogonal to said first axis and mobile along said third axis, wherein the first carriage comprises a base provided with at least one first portion coupled to said first guiding means and at least one second portion rigidly connected to said upright, a releasable connector for reciprocally connecting said first portion and said second portion of said base, and second articulated connection means between said first portion and said second portion of said base for allowing said upright to be tipped with respect to said first portion when said releasable connector is released.

2. A machine according to claim 1, wherein said articulated connection means comprises a hinge connection defining an axis of rotation of said second portion with respect to said first portion.

3. A machine according to claim 2, wherein in that said base comprises ball circulation runners coupled to said guides.

4. A machine according to claim 1, wherein said first guiding means comprises a pair of side guides carried by said base and parallel to said first axis, and wherein said second portion of said base is defined by a central portion of said base rigidly connected to said upright, and wherein said at least first portion of said base is defined by a pair of side shoulders coupled to respective guides.

5. A machine according to claim 4, wherein said releasable connector comprises a plurality of first screws which connect each of said shoulders to opposite sides of said central portion.

6. A machine according to claim 4, wherein said hinged connection comprises a pair of reciprocally coaxial screws which connect each of said shoulders to opposite sides of said central portion.

7. A machine according to claim 4, wherein said first carriage, said second carriage and said arm are actuated by respective electric motors, the electric motor operating said first carriage being carried by one of said side shoulders.

8. A machine according to claim 7, comprising an articulated chain for protecting electrical power and control wirings of said electric motors having one end fastened to the base and one end fastened to said shoulder.

9. A machine according to claim 1, comprising a fastener that secures said upright onto said base in a tipped position of said upright.

10. A machine according to claim 9, wherein said fastener comprises a bracket fixable to an upper end of said upright and an upper surface of said base.

11. A machine according to claim 1, wherein said base has a flat treadable top wall and wherein said side guides are fastened underneath said top wall of said base.

\* \* \* \* \*